United States Patent [19]
Petersen

[11] B  3,927,415
[45] Dec. 16, 1975

[54] ELECTROMAGNETICALLY REGULATED EXPOSURE CONTROL SYSTEM

[75] Inventor: Christian C. Petersen, Westwood, Mass.

[73] Assignee: Polaroid Corporation, Cambridge, Mass.

[22] Filed: Apr. 11, 1973

[21] Appl. No.: 350,025

[44] Published under the Trial Voluntary Protest Program on January 28, 1975 as document no. B 350,025.

[52] U.S. Cl. ................... 354/230; 354/30; 354/43; 354/60 R; 354/235; 354/271
[51] Int. Cl.² ..................... G03B 7/08; G03B 9/02
[58] Field of Search ........... 95/10 CT, 53 E, 53 EA, 95/53 EB, 59, DIG. 2; 354/23, 40, 42, 43, 44, 59, 60, 270, 271, 230, 30, 234, 235

[56] References Cited
UNITED STATES PATENTS

| | | |
|---|---|---|
| 3,230,853 | 1/1966 | Dunst............................. 354/260 X |
| 3,373,672 | 3/1968 | Ichijo................................... 354/50 |
| 3,412,660 | 11/1968 | Wasielewski......................... 95/59 X |
| 3,604,330 | 9/1971 | Fahlenberg et al. ..................... 95/53 |
| 3,633,484 | 1/1972 | Ikegami et al. .......................... 95/53 |
| 3,744,385 | 2/1973 | Burgarella et al. ........... 95/53 EA X |

*Primary Examiner*—Joseph F. Peters, Jr.
*Attorney, Agent, or Firm*—Gerald L. Smith

[57] ABSTRACT

An exposure control system characterized in the use of a solenoid which is energized to drive exposure mechanism blades into an aperture blocking position. An interval of exposure is defined by de-energizing the solenoid to permit the mechanism to define varying aperture values under a spring drive. The invention provides control over the rate of this aperture determining spring biased movement, through the insertion of a select current level energization to the solenoid during the noted opening movement. Broader design latitudes for improved exposure programs are available with the arrangement.

31 Claims, 13 Drawing Figures

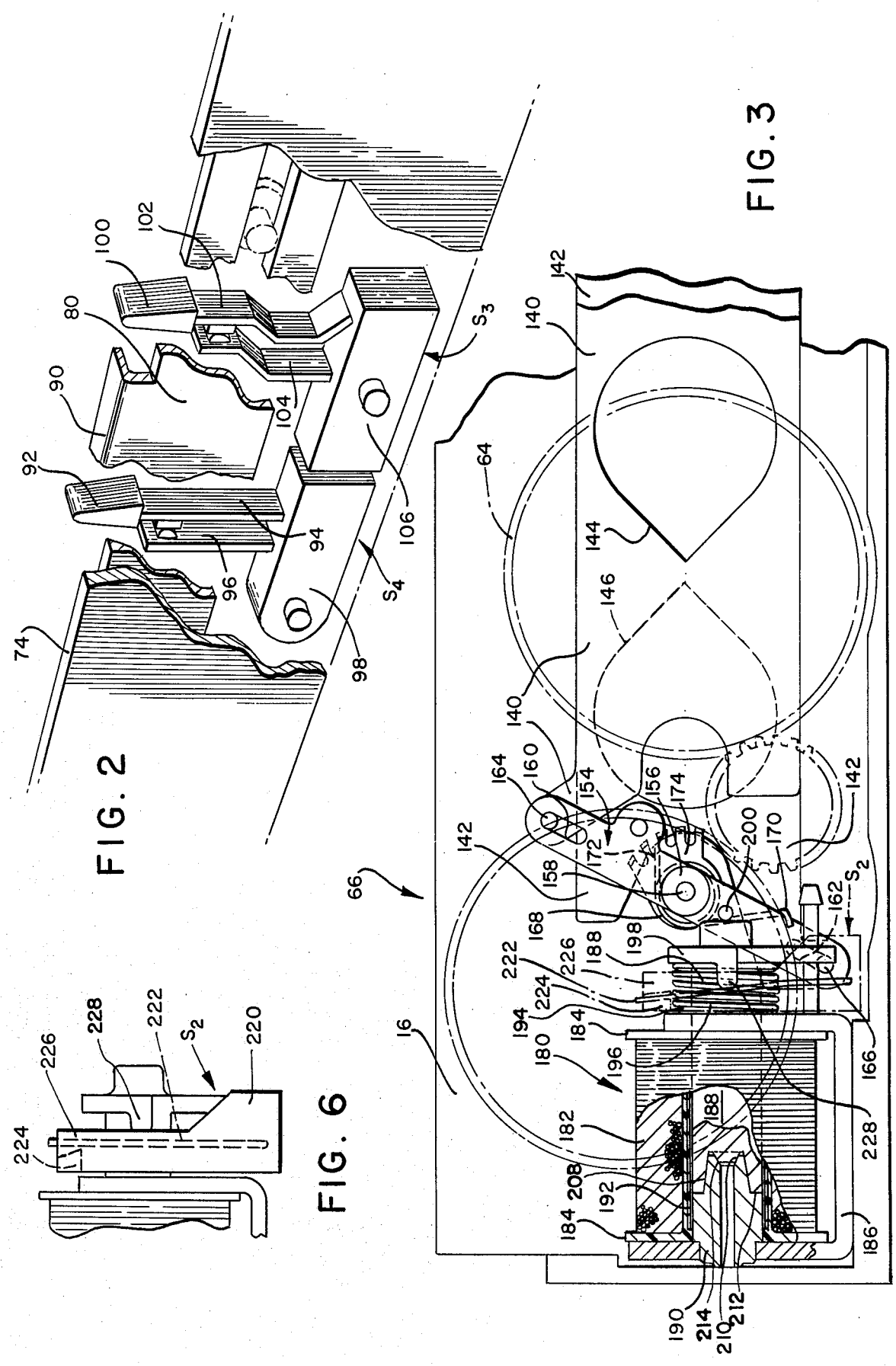

ELECTROMAGNETICALLY REGULATED EXPOSURE CONTROL SYSTEM

BACKGROUND OF THE INVENTION

Automatic exposure control systems for photographic devices function to evaluate scene brightness for levels of illumination, weight this evaluation with respect to the sensitometric characteristics of a film being exposed and regulate one or more variable exposure control parameters, for instance exposure interval and aperture size, in correspondence with the weighted evaluation. Certain of these control systems provide for automatic control over both aperture selection and shutter speed under a predetermined program devised to optimize parameter selection for the more often encountered scene conditions. In designing such optimized programs, generally it is desirable to maximize the depth of field characteristics of a resultant image while making an exposure in the shortest exposure interval available in order to record scene activity without blurring. Ideally, therefore, aperture is selected at such higher f/stop values as may be practically available, while corresponding shutter speed is selected as fast as possible in view of the lighting conditions and desired aperture setting. For the most part, the exposure programs compromise or draw a balance between achieving large depth of field through the use of small relative apertures and in selecting appropriate exposure interval times.

In addition to the foregoing photographic exposure criteria, the shutter systems also may be called upon for duty within cameras incorporating complex cycle logic. For instance, should the shutters or exposure mechanisms be required to perform within the cycle of a fully automated single lens reflex camera, they must assume an open status providing maximum aperture diameter size during the steps or operational mode of viewing and focusing in order to derive sufficient light for reflex viewing optics. Following a viewfinding and focusing procedure, the exposure control system must automatically close to fully block the camera's optical path in order to permit the conversion to an exposure mode without jeopardizing the light-tight integrity of its exposure chamber. This procedure usually involves the movement of a reflex mirror or the like and consequent realignment of the optical path of the camera. Following the delay occasioned by this operational mode adjustment, the exposure control system then functions automatically to commence an exposure interval and provide the above-described dual exposure parameter control in accordance with the design exposure program. At the termination of an exposure interval, the exposure control system is called upon to block the passage of scene light to the exposure plane or exposure chamber and to remain in that blocking position until the optical path components of the camera mechanism reassume the initial viewing-focusing mode and until such other operations such as film processing and the like are carried out. At the termination of a cycle, the exposure control mechanism again is required to assume maximum aperture size to permit viewing and focusing for a next succeeding photographic cycle.

One exposure control system ideally suited for use within the complex cycle of an automated single lens reflex camera is described in U.S. Pat. No. 3,641,889. This system is characterized in the use of a tractive electromagnet in the form of a solenoid, the plunger of which is coupled in driving relationship with shutter blade members designed to establish a time dependent variation of aperture values over an exposure aperture as the blades are moved between open and closed terminal positions. Connection between the blades and the solenoid is arranged such that the blades are closed upon energization of the solenoid and are opened under a spring bias at such time as the solenoid is selectively de-energized.

An exposure interval is commenced by de-energizing the solenoid from an energized state so as to permit the blades to commence to move from a blocking terminal position to define varying aperture values. At such time as a proper exposure value has been achieved, the solenoid again is energized to rapidly return the blades to their closed orientation.

Because the blades define an aperture of maximum width at such time as the solenoid is permitted to remain de-energized, the exposure control system ideally is suited for a photographic cycle requiring a normally fully open shutter condition as well as periods of shutter closure for securing the exposure chamber of the camera during operational mode conversion procedures. Where such systems are utilized in a very thin and compact camera structure, the power supplies therefor are somewhat critical. Therefore, the control system operating the solenoid driven shutter preferably incorporates an energy conserving feature wherein the excitation winding of the solenoid is energized at a lower current level during the periods when the shutter is held in its closed or light-blocking position. Such a current drop is feasible inasmuch as the flux linkage provided within the magnetic circuit between the movable plunger of the solenoid and the magnetizable core plug toward which it rides is readily derived when the plunger is near its fully retracted or seated orientation. An arrangement for so controlling a shutter driven solenoid is described in a copending application for U.S. Pat. by C. H. Biber and E. K. Shenk, Ser. No. 163,948, filed July 19, 1971 now U.S. Pat. No. 3,791,278, and assigned in common herewith.

To achieve a desired exposure program for this form of shutter or exposure mechanism, it is desirable that the opening rate of the shutter blades defining the noted variation of progressively increasing aperture widths be relatively slow, while the rate of shutter closure derived through solenoid energization be as rapid as possible. A slower opening rate provides dual advantage, for instance, improved depths of field are available at more frequently encountered scene brightness levels and a requisite anticipation feature required of the control circuit for reversing the blades as appropriate aperture value is reached is more readily designed.

This anticipation feature usually is provided through a photocell "sweep" feature wherein the light sensing elements of a control circuit are uncovered gradually and simultaneously in mutual correspondence with the progressive variation of aperture over the taking lens optical path of the camera. The sweep feature is so designed as to accommodate for the amount of delay required in stopping the blades and reversing them for movement into an exposure terminating light blocking orientation. An opening movement of the exposure mechanism or shutter blades also should be provided in consistent and repeatable fashion. Without such consistency, exposure error stemming from the noted anticipation design requirements is likely to occur.

SUMMARY OF THE INVENTION

The present invention is addressed to an improved exposure control method and system of a variety selectively utilizing a tractive electromagnetic device as well as a spring bias to move the mechanical elements of an exposure mechanism in a manner defining a time-dependent progressive variation of aperture values over an optical path. By simultaneously combining the effects of the spring bias with a select energization of the tractive electromagnet during such aperture defining movement, a desirably programmed and controlled definition of aperture values for a given level of scene brightness is achieved. The magnetic damping technique of the invention advantageously enjoys immunity from the adverse effects of temperature and humidity changes necessarily encountered where pneumatic systems or the like are utilized for the instant purpose. Further in this regard, the deterioration of mechanically operative damping systems inherently derived due to wear and the like with continued operation of a camera is minimized significantly.

Another advantageous feature of the magnetic damping arrangement of the invention resides in the automatic isolation of the retarding influence of the damping technique during shutter closure to terminate an exposure interval. For instance, in a preferred embodiment of the invention wherein a solenoid plunger is retracted into an energized excitation winding to provide shutter closure, field buildup within the winding is accelerated due to the already existent low level magnetic field utilized for damping purposes. As a consequence, the design anticipation period required for halting and reversing the motion of the exposure mechanism elements is reduced. Such reduction in the time span of the reversing activity permits improved performance of the entire exposure system at high brightness levels wherein only a relatively small opening of the shutter element and corresponding short exposure interval is required.

In a preferred embodiment of the invention, a power-down feature of the control system of a solenoid actuated shutter is utilized both for power conservation purposes at full shutter closure and to provide magnetic damping during opening movement of the elements of the exposure mechanism. This reinsertion of a selectively lowered current level within the excitation winding of the shutter solenoid may be provided through a switching arrangement which is activated following a slight increment of movement of the plunger of the drive solenoid thereof. This same switch may be utilized during the shutter closing performance of the exposure mechanism for purposes of asserting the noted power-down operation during operational mode conversion intervals and the like of a complex photographic cycle.

Another advantage, object and feature of the invention is to provide the noted magnetic damping arrangement for a solenoid driven exposure mechanism in combination with a solenoid design incorporating an orifice for venting the winding core within which the solenoid plunger is movably mounted. As a consequence, the closing rate of the resultant exposure mechanism advantageously may be enhanced.

A further feature and object of the invention is to provide a dynamic performance improvement for an exposure control system of a variety wherein a solenoid is employed to be energized at one level to drive an exposure mechanism into an orientation blocking the optical path of a camera and the exposure mechanism is driven by resilient means such as the spring toward orientations unblocking that optical path and establishing a progressive variation of aperture values over the path. The improvement includes means for energizing the solenoid or tractive electromagnetic device at another level of energization selected below its full energization level when the exposure mechanism is driven toward its unblocking orientation so as to alter the photographic exposure characteristics over the path in accordance with a predetermined exposure program. Calibration of the dynamic opening characteristic of the exposure mechanism as it is magnetically damped may be provided electronically, for instance by varying a resistor or the like, or may be inserted through the relatively simple expedient of adjusting the noted drive spring.

The invention is particularly characterized in its immunity from any adverse effects of atmospheric environment, a characteristic lending to necessary repeatability of performance over numerous photographic cycles. Further, the inventive arrangement ideally is suited for use with the exposure mechanism of a fully automatic single lens reflex camera of the type described, the arrangement making dual use of a power conservation feature of the control system of such a camera.

Other objects of the invention will, in part, be obvious and will, in part, appear hereinafter. The invention, accordingly, comprises the system, method and apparatus possessing the construction, combination of elements and arrangement of parts which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 2 is a fragmentary detail view of a portion of the mechanism revealed in FIG. 1;

FIG. 3 is a partial plan view of an exposure mechanism as is incorporated in the camera of FIG. 1;

FIG. 6 is a fragmentary detail view of a portion of the mechanism revealed in FIG. 3;

DETAILED DESCRIPTION

Reflex Camera — General Structure

Figure 1:
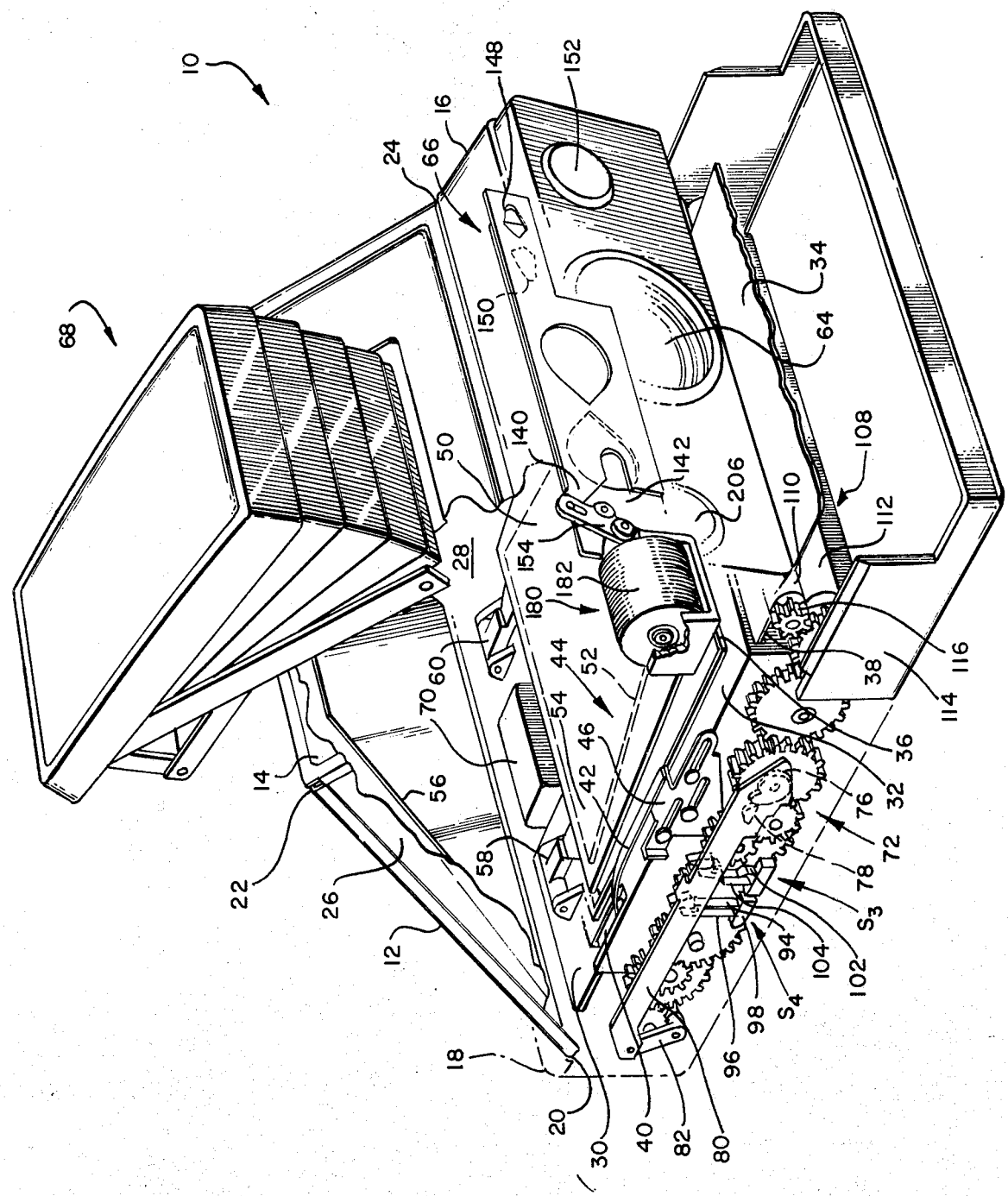
FIG. 1 is a pictorial view of a fully automatic hand-held camera incorporating the control system features of the instant invention, the view having portions broken away or removed to reveal internal structure.

Referring to FIG. 1, a fully automatic reflex camera incorporating the features of the instant invention is portrayed generally at 10. The several articulated housing components of camera 10, including rear wall 12, forward wall 14 and exposure control housing 16 are pivotally associated with a base 18 so as to be foldable thereinto in nesting fashion. When so folded from the erect configuration shown, the camera 10 assumes a thin and compact shape suiting it to be conveniently carried in the pocket of a garment. The specific hinge connections providing for the articulated structure, while not being visible in the figure, are positioned at axes 20, 22, 24 and the lower rear portion of exposure housing 16.

When erected for making an exposure, rear wall 12, forward wall 14 and exposure control housing 16 combine in conjunction with an opaque flexible bellows, a fragment of which is illustrated at 26, to define an exposure chamber generally depicted at 28.

Base 18 includes an inner frame assembly, a portion of which is shown at 30. Inner frame assembly 30, as well as the outward portions of base 18, cooperate to provide structural support for numerous instrumentalities of the camera. For instance, frame 30 is configured to define a receiving chamber for retaining and securing a film laden cassette 32 at the bottom of exposure chamber 28. Cassette 32 is of generally flat, rectangular shape and contains a stacked assemblage of photographic film units, a portion of one being shown at 34. Film units as at 34 are arranged for sequential presentation at a light entrance portion of cassette 32 which is defined by a ridge 36. The underside of ridge 36 serves as a seat against which the uppermost one of the film units abuts. The forward wall of cassette 32 is formed having an elongate slot 38 disposed thereacross. Slot 38 serves as an egress means providing for the sequential removal of each film unit as at 34. Cassette 32 also is formed having a slot or opening in the upward face thereof at 40. Slot 40 permits the insertion of the resilient drive leaf 42 of a pick mechanism shown generally at 44. Mechanism 44 functions to impart initial movement to the film units as they are removed from the cassette 32.

Camera 10 operates in a modified reflex fashion, being convertible between viewing and exposure operational orientations by a reflex assembly including a somewhat planar reflex reflecting component 50. Shown at a position evidenced during a transition from an exposure to a viewing operational mode, the component 50 is configured having a mirror surface 52 mounted upon its underside and a viewing surface 54 positioned on or forming its upward surface. In the course of a photographic cycle, reflex component 50 is moved from a viewing position against ridge 36 of cassette 32, where it serves to secure the light entrance portion thereof, to an exposure position abutting against a mirror 56 located upon the inner side of rear wall 12. Movement between the viewing and exposure positions is pivotal, the component 50 being coupled to inner frame 30 at hinges 58 and 60.

When component 50 is positioned over ridge 36 of cassette 32 to secure the exposure plane of a camera, a viewing optical path is established. This path extends from a taking lens mounted at 64 in exposure housing 16, through an exposure mechanism depicted generally at 66, which establishes an aperture opening of maximum available width, thence to the reflecting surface of mirror 56 at the rear of the camera and thence to viewing surface 54 at the upward side of reflex component 50. Viewing surface 54 is configured having a texture and optical design facilitating the focusing of the image of the scene to be photographed. This image may be viewed by the camera operator through a collapsible optical viewing assembly depicted generally at 68. A configuration suited for a viewing surface 54 is described and claimed in U.S. Pat. No. 3,690,240 by Nathan Gold, entitled "Reflective Imaging Apparatus," while the assembly 68 and its related internal components are described in detail in a copending application for U.S. Pat. by James G. Baker, filed Dec. 15, 1970, entitled "Reflex Camera and Viewing Device" Ser. No. 98,356, and assigned in common herewith.

The exposure optical path orientation of camera 10 is established by pivoting reflex component 50 substantially against the inner surface of rear wall 12. In this orientation, the optical path extends from the taking lens at 64 and exposure mechanism 66 to mirror 52 positioned on the underside of reflex component 50, thence to the uppermost one of the film or photographic units positioned beneath ridge 36 of cassette 32. Note that such uppermost film unit is located at the exposure plane of camera 10.

Component 50 is retained in its light securing position by a driven instrumentality operating through hinge 58. Described in detail and claimed in U.S. Pat. No. 3,714,879 the driven instrumentality is regulated from a control system which utilizes the output of a motor 70 to selectively drive an elongate, thin gear train, certain components of which are shown generally at 72, extending along one side of camera 10. The various gear components of gear train 72 are rotatably mounted upon camera 10 between inner frame 30 and an outer plate 74 (FIG. 2). Two reduction ratio circuits are present in gear train 72 one such circuit terminating in a phase control cam 76 which is rotatably driven through one revolution during the course of a single photographic cycle. Cam 76 operates in conjunction with a cam follower 78 positioned on the inwardly facing side of an elongate ram 80. Ram 80 is slidably mounted for movement along gear train 72 between the outer face thereof and outer plate 74 and is driveably connected to an input bell crank 82 mounted, in turn, at the rear of camera 10. Input bell crank 82 is connected by a spring linkage to reflex component 50 at hinge 58. As is described in detail in the noted application for patent, Ser. No. 134,733, this spring linkage provides a drive spring feature utilized to move component 50 into its exposure position, as well as an override spring system feature, permitting the cocking operations to proceed even though component 50 may be stuck in an upward position.

The position of reflex component 50 throughout any given photographic cycle is controlled by select energizations of motor 70 and the consequent rotation of phase control cam 76. For instance, when the optical path of camera 10 is in a viewing orientation, cam follower 78 and ram 80 serve to retain reflex component 50 in its exposure plane securing position over ridge 36 of cassette 32. When reflex component 50 is so retained, cam 76 is in a radial orientation wherein it holds follower 78 and associated ram 80 at a terminal rearward position against the bias exerted by the noted spring linkages utilized to drive component 50 and exerted through input bell crank 82. A controlled energization of motor 70 earlier in a given photographic cycle causes the gear train 72 to rotate cam 76 to a position whereat follower 78 releases from contact therewith, permitting ram 80 to be driven with coupled reflex component 50 into their respective terminal positions for exposure mode operations. Note, in this regard, that ram 80 and reflex component 50 operate in corresponding synchronism, ram 80 serving as a dynamic tracking device.

Referring additionally to FIG. 2, as ram 80 commences forward movement in conjunction with the noted release of reflex component 50, a tab 90 extending inwardly therefrom releases from engagement with the insulative cap 92 formed upon a resilient leaf 94 of a switch identified generally as S$_4$. Switch S$_4$ additionally includes a resilient leaf 96 which is supported along with leaf 94 from an insulative base 98 fixed to outer plate 74 of base 18. Accordingly, the contacts represented by leaves 94 and 96 of switch S$_4$ are opened substantially in synchronism with the initial movement of component 50 from its viewing position.

The spring biased rotational travel of reflex component 50 about its hinges 58 and 60 from its seated exposure position is carried out within about a 37° arc. When reflex component 50 somewhat closely approaches its seated position against rear wall 12 and mirror 56, tab 90 contacts the insulative cap 100 of a resilient leaf 102 of another switch depicted generally as S$_3$. Leaf 102 is normally in contact with a second leaf 104 of switch S$_3$ and both leaves are supported from an insulative base 106, also fixed to outer plate 74. Serving to monitor the movement of component 50, the open contacts of switch S$_3$ provide a signal condition evidencing that the component 50 has approached its seated position against rear wall 12.

Following an exposure interval, a post-exposure phase of a photographic cycle is carried out by re-energizing motor 70 to drive gear train 72, thereby rotating phase control cam 76. As cam 76 is rotated, contact between the control surface thereof and follower 78 is reasserted to drive ram 80 rearwardly and cock reflex component 50 into its viewing position. Simultaneously with this cocking activity, a second reduction circuit within gear train 72 functions to drive a processing station shown generally at 108. Station 108 is comprised of two cylindrical rolls 110 and 112 mounted within an access door, the cover of which is shown at 114. Roll 110 of the station is connected with gear train 72 through a drive pinion 116. The components of the camera, as they are oriented towards the termination of conversion from an exposure to a viewing mode, are represented in FIG. 1.

At the commencement of the noted second deenergization of motor 70, while roll 110 is being driven, pick mechanism 44 is actuated to engage the uppermost photographic film unit 34 and to move it through forwardly disposed egress slot 38, thence into the bite or point of tangency between rotating processing rolls 110 and 112 of station 108. Described in detail in a copending application for U.S. patent, Ser. No. 171,127 by E. H. Land, entitled "Film Advancing Apparatus" filed Aug. 12, 1971 now U.S. Pat. No. 3,753,392 and assigned in common herewith, mechanism 44 includes a carriage assembly 46 which is selectively driven from a cam (not shown) present within gear train 72 supporting resilient drive member 42, carriage 46 is reciprocably moved during a photographic cycle to carry out its intended purpose.

Photographic units 34 are processed by the pressure applied from rolls 110 and 112 of processing station 108 as they are drawn therethrough. Described in detail in a U.S. patent by E. H. Land, U.S. Pat. No. 3,672,890, these units are structured to contain a processing fluid which is spread therewithin to cause the formation of a visible positive image.

Exposure Apparatus

The exposure control system of camera 10 is required to operate exposure mechanism 66 in a manner establishing an aperture opening of maximum width or light transmissability for viewing and focusing purposes. During the conversion of the optical path of the camera from a viewing orientation to an exposure orientation, mechanism 66 is retained in a fully closed condition to secure exposure chamber 28. Further, in the course of an exposure interval, mechanism 66 and its related control provides for a dual exposure parameter regulation in which both aperture and exposure interval are controlled in accordance with a predetermined, optimized photographic program. For instance, under such a program, relative aperture should be selected automatically to optimize depth of field, while exposure interval is selected to maximize taking speed.

Figure 5:
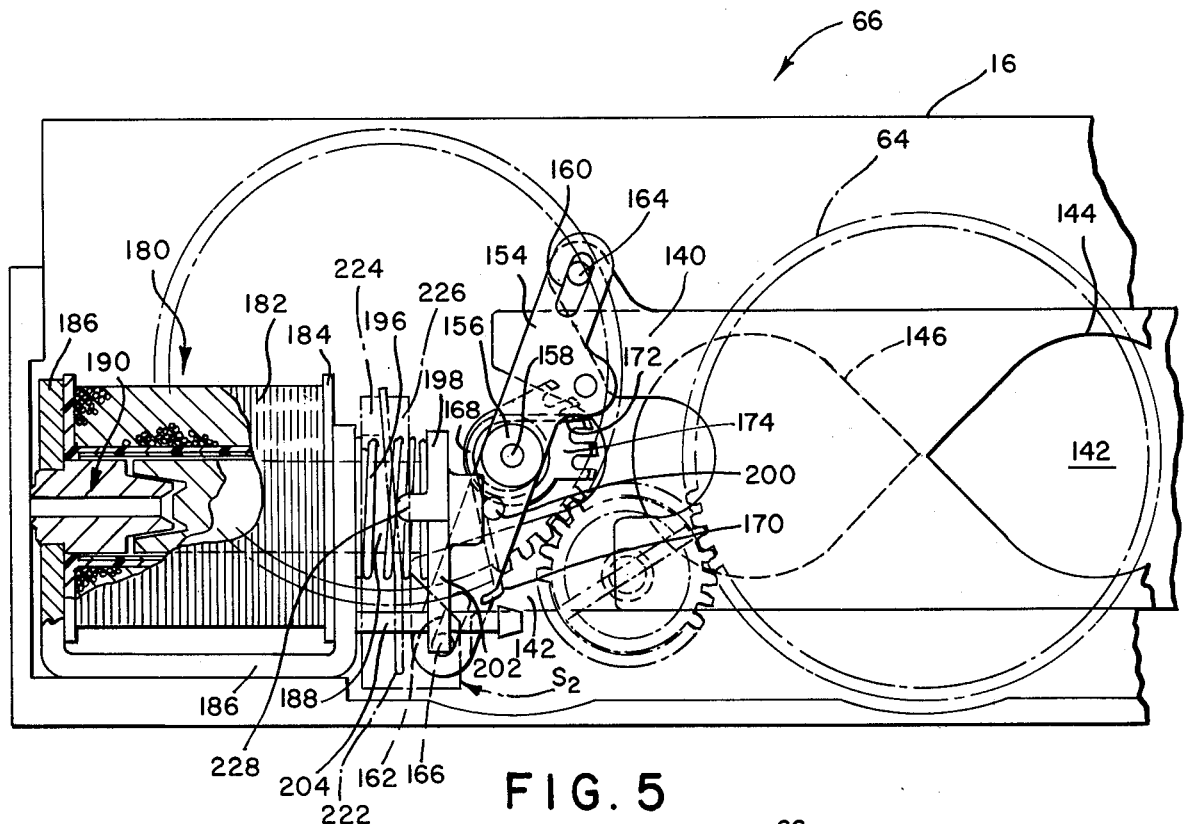
FIG. 5 is a partial plan view similar to FIG. 4 but showing a different orientation of the components thereof.
Figure 4:
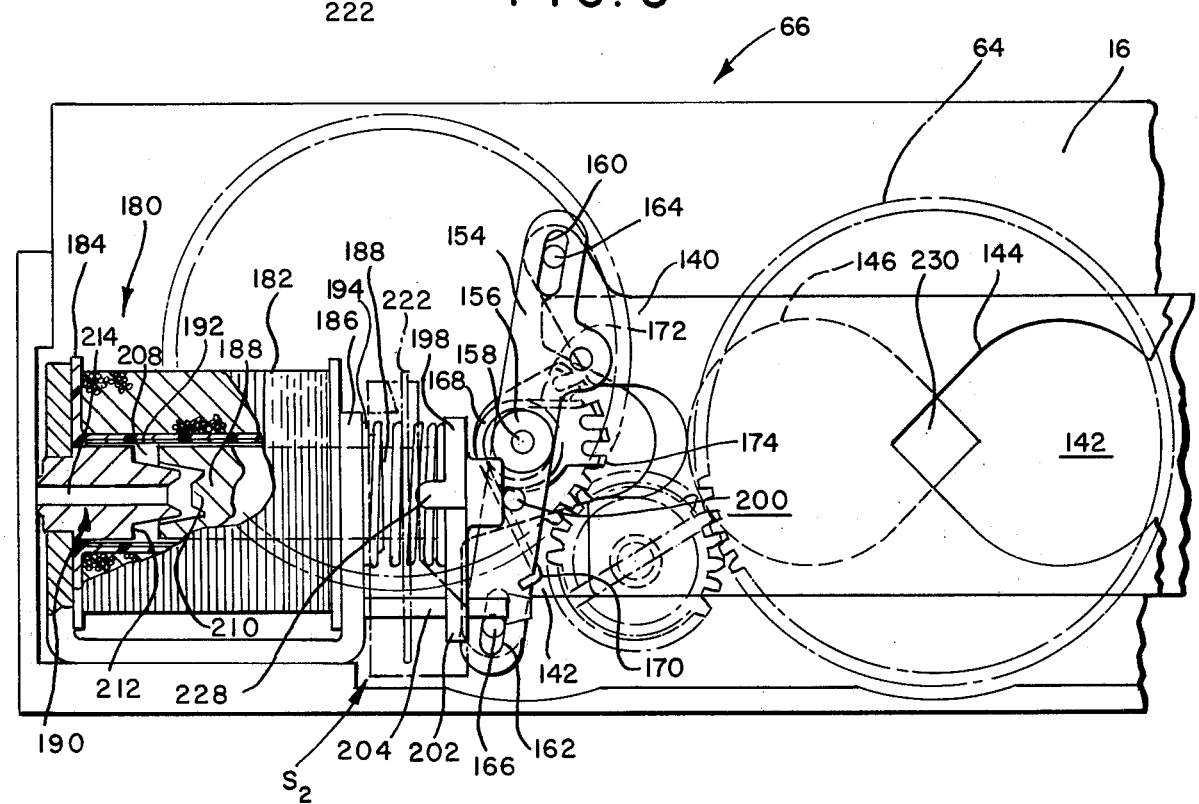
FIG. 4 is a partial plan view of the exposure mechanism of FIG. 3, showing the components thereof in a different orientation.

Looking additionally to FIGS. 3, 4 and 5, exposure mechanism 66 is shown to be formed having two blades, 140 and 142, which are slidably mounted for movement within exposure housing 16 about the taking optical path at taking lens 64. Each blade, 140 and 142, is formed having a teardrop shaped aperture opening as shown, respectively, at 144 and 146. Additionally, the blades are formed having secondary or "photocell sweep" openings shown respectively at 148 and 150 (FIG. 1) which move in synchronism with openings 142 and 144 before the detecting element of a photosensing network positioned behind an entrance optical assembly 152.

Depending upon the positions of blades 140 and 142, openings 144 and 146 symmetrically overlap to define selectively varying aperture sizes. Secondary openings 148 and 150 are configured somewhat in correspondence with the contours of respective openings 144 and 146 and also move in mutual symmetry over the optical path of a light sensing network of the control system of the camera.

Blades 140 and 142 are moved in mutual symmetry as a result of their connection with a walking beam type actuator shown at 154. Walking beam 154 is formed having a centrally disposed hub portion 156 which is journalled for rotation about an upstanding stud 158 extending from the rearward portion of exposure control housing 16. Elongate slots as at 160 and 162 (FIGS. 3–5) are formed in the tip portions of walking beam 154 for the purpose of providing connection with pins 164 and 166 extending, respectively, from blades 140 and 142.

A bias urging walking beam 154 to move blades 140 and 142 into a closed orientation is provided by a closing spring 168. Wound about hub 156, spring 168 is formed having a moving end bent around the lower portion of walking beam 154 and a stationary end 172 grounded within a comb structure 174. Comb 174 is fixed to exposure housing 166 and is formed having a series of teeth or detents within which spring end 172 selectivey may be positioned in order to calibrate the bias value exerted thereby.

Actuation of blades 140 and 142 for purposes of controlling exposure as well as for securing the exposure chamber 28 is carried out by a tractive electromagnetic device such as a solenoid depicted generally at 180. Described in detail in a copending application for U.S. Patent by C. C. Petersen, entitled "Tractive Electromagnetic Device", Ser. No. 245,884, filed Apr. 21, 1972 now U.S. Pat. No. 3,805,204, and assigned in common herewith, solenoid 180 is generally structured to include an excitation winding 182 spirally wound about an insulative supporting bobbin 184. Bobbin 184, in turn, is positioned within a U-shaped frame 186 fixed, in turn, to the bottom of housing 66. Symmetrically disposed internally of excitation winding 182 is a cylindrically shaped movable armature or plunger 188 and a cylindrically shaped stationary armature or plug 190. Plunger 188 slidably rides upon the internal surface of a non-magnetic liner 192 forming the internal hollow core of bobbin 184. An annular flux ring 194 is positioned over the forward end of liner 192 for the purpose of improving the magnetic flux circuit path linkage between frame 186 and plunger 188.

Plunger 188 is biased to move outwardly from a fully retracted position within excitation winding 182 by an opening spring 196. Present as a spirally wound compression spring of relatively high spring index, opening spring 196 is constrained between frame 186 and flux ring 194 and an outer striker cap 198 fixed to the outer extremity of plunger 188. Cap 198 is positioned to establish an abuttable contact with an upstanding pin 200 extending from the lower leg of walking beam 154. Cap 184 is maintained in an appropriate vertical alignment as a result of its slidable connection at an extension 202 thereof with a guide pin 204 fixed to and extending from frame 186. The loading or force value characteristics of spring 196 are selected as being greater than the loading characteristics of closing spring 168. Accordingly, when plunger 188 is released from its retracted position upon the de-energization of excitation winding 182, spring 196 urges the plunger outwardly to cause striker cap 198 to contact pin 200 and drive walking beam 154 towards positions establishing progressively widening apertures. When plunger 188 is fully extended, blades 140 and 142 define an opening of maximum aperture width suited for viewing and focusing purposes.

When viewing and focusing of a scene has been accomplished under maximum aperture width conditions, a start button 206 (FIG. 1) is manually depressed to cause the control system of camera 10 to carry out the energization of excitation winding 182. As a consequence, plunger 180 is retracted toward a seated position at a rapid rate while spring 168 drives blades 140 and 142 into a terminal position blocking the optical path at taking lens 64 as well as that present at light sensing network optics 152. The retracted or light blocking orientations for the various components of mechanism 66 are revealed in FIG. 3.

As shown in FIGS. 3–5, plunger 188 and corresponding plug 190 are configured having confronting end faces each of which, in turn, is formed having selectively structured extensions and recesses. Illustrated in FIG. 3 in a fully seated and nested orientation, the cylindrically shaped end faces define a major working gap interface 208 which is generally shaped as a right conical frustum. The apex of this frustum is additionally configured having a minor cone working gap interface as shown at 210. Another characteristic of the confronting end faces of plunger 188 and plug 190 resides in the provision of confronting seating surfaces which are contactable at the plane defined by line 212. The seating surfaces are formed inwardly from the respective peripheries of the end faces of plunger 188 and plug 190. When plunger 188 is fully retracted, contact as shown at 212 is effected between opposing annular shaped surfaces. Another characteristic of the structure resides in the presence of a hole or orifice 214 formed centrally within plug 190 and serving a venting function.

During movement of plunger 188 toward its seated position as shown in FIG. 3, the confronting end face thereof develops a magnetically attracting association with plug 190 as the fully seated position is approached. More particularly, as shown in FIG. 5, when blades 140 and 142 have been driven to a position wherein the optical path of the camera is blocked but before a fully seated orientation is reached, an enhanced flux linkage condition will be present intermediate select portions of the confronting end faces of plunger 188 and 190. Due to the momentum of plunger movement as well as flux density, the level of exciting current introduced to excitation winding 182 may be substantially reduced, for instance to within about 10% of its original value. This selectively lowered or powered down current level is sufficient to provide adequate flux linkage to retain plunger 188 in abutting contact at plane 212 with plug 190 against the bias exerted by spring 196.

Operating in conjunction with solenoid 180 is a switch designated $S_2$. Looking additionally to FIG. 6, switch $S_2$ is formed having an upstanding insulative base 220 fixed, in turn, to an extension of frame 186. Base 220 supports an elongated contact rod 222, the upwardly extending portion of which is configured to wipe across a conducting surface 224 as it is moved from contact with a non-conducting surface 226. Formed of conductive and resilient material and connected in cantilever fashion to base 220, the rod 222 is oriented to assume a rest position contacting non-conducting surface 226. When solenoid 180 is energized and its plunger 188 is retracted, however, an actuating extension 228 of striker cap 198 contacts and drives rod 222 to cause it to wipe against and make an electrical contact with conducting surface 224. For instance, note in FIG. 4 that as blades 140 and 142 define an open aperture condition or are being driven towards a closed orientation, contact between extension 228 and rod 222 is not made, rod 222 remaining in its neutral position against non-conducting surface 226. As blades 140 and 142 just reach their fully closed position, contact between rod 222 and extension 228 will have been made and rod 222 commences to make contact with conducting surface 224. The later orientation is shown in FIG. 5. Note, particularly in that figure, that the confronting end face of plunger 188 will have been moved to a position described earlier as representing an enhanced flux linkage condition or orientation with respect to the complementary confronting end face of plug 190. As a consequence, the signal represented by the movement of rod 222 onto contact surface 224 may be utilized to initiate a power-down excitation current level change within solenoid winding 182. Further motion of plunger 188 causes the exposure mechanism 66 to assume the orientation shown in FIG. 3. Note that contact rod 222 has moved a small increment across conducting surface 224.

An exposure under ambient lighting conditions is defined by mechanism 66 by selectively energizing and de-energizing solenoid 180. For instance, once the blocking orientation shown in FIG. 3 is achieved, the control system of camera 10 selectively de-energizes solenoid 180 to permit plunger 188 to be driven under the bias of opening spring 196 to move blades 140 and 142 in a manner defining a progressive variation of aperture values. When sufficient light energy has been admitted through the aperture as shown at 230 in FIG. 4, winding 182 of solenoid 180 is again energized to rapidly return the mechanism to its light blocking orientation shown in FIG. 3. Note that the control over the energization of solenoid 180 is required to anticipate the amount of time required to reverse the motion of walking beam 154 and blades 140 and 142 as well as the interval required to cause the exposure mechanism to block the optical path. This anticipation feature is provided through selective design of the configuration of secondary openings 148 and 150 (FIG. 1) as they define aperture variations within the optical path of light sensing network optics 152. It will be apparent that consistency of opening performance as well as rapidity of shutter closing are features essential to accurate operation of the mechanism 66. Further, greater exposure programming latitude is available from the control system where the rate of opening movement of blades 140 and 142 is selectively retarded. Of course, where the opening rate is controlled to a desirably slower value and closing rate is enhanced, the anticipation function of the control system is more readily designed and inserted within the system. The instant control system ideally provides a retardation or rate control over the opening movement of blades 140 and 142 while enhancing the closing rate. This retardation control is provided by reasserting the low, power-down current at excitation winding 182 after plunger 188 has commenced outward movment, the confronting end face thereof having moved from its seated position. In a preferred embodiment, switch $S_2$ is utilized to reassert this power-down feature as it is utilized for magnetic damping purposes. The magnetic damping arrangement also advantageously permits the utilization of an orifice at 214 within plug 190. The orifice 214 allows a venting of the chamber established between the confronting end faces of plunger 188 and plug 190 thus enhancing closing performance of the solenoid driven mechanism.

Control Circuit

Referring to FIGS. 7-10, a descriptive chart as well as schematic diagram for a control circuit along with related truth tables and energization state diagrams serving to carry out the operational events discussed above are displayed. The circuit of FIG. 7 includes a series of multifunction gates designated A - C. The inputs and outputs for these gates are depicted in Boolean enumeration in the truth table represented in FIG. 9 as well as by energization state curves in FIG. 10. For purposes of understanding the tabulations within these figures, as well as to facilitate the description to follow, when the inputs or outputs of the listed components are at ground reference potential, they are referred to as "low" and, additionally, such input or output may be digitally identified as (0). Conversely, when these inputs and outputs assume or approach the voltage status of the power supply of the control circuit, they are referred to as being "high" and are given the binary designation (1). The operational events as tabulated and numbered in FIG. 9 are again identified by the same numeration in the corresponding energization state diagram of FIG. 10. In the latter diagram, the status of switches $S_1 - S_4$ of the circuit as well as the energization states of various components thereof are shown in comparitive time scale fashion. It may be noted further that certain of the gate input terminals receive common signals. These common terminals are identified by the letters "$a - d$." Additionally, the outputs of GATES A - C are identified, respectively, by the letters "$t_1 - t_3$." Where solid state components such as transistors are forwardly biased, they may be described as being "on" or "activated." Additionally, where the junctions of such components are not rendered conductive, they are referred to as being "off" or "de-activated."

Figure 7:
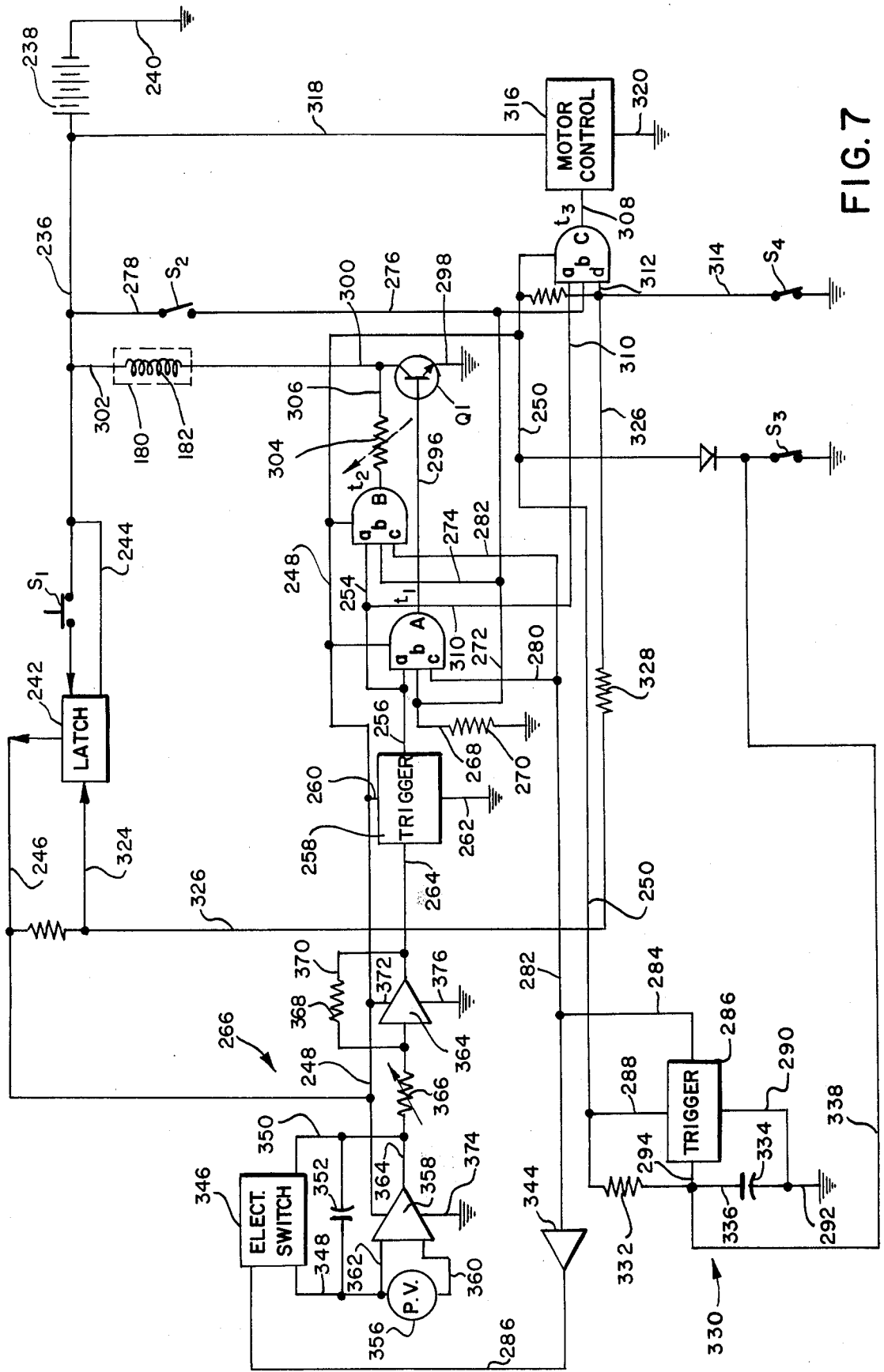
FIG. 7 is a schematic diagram of a control circuit used in conjunction with the control system of the camera of FIG. 1.
Figure 8:
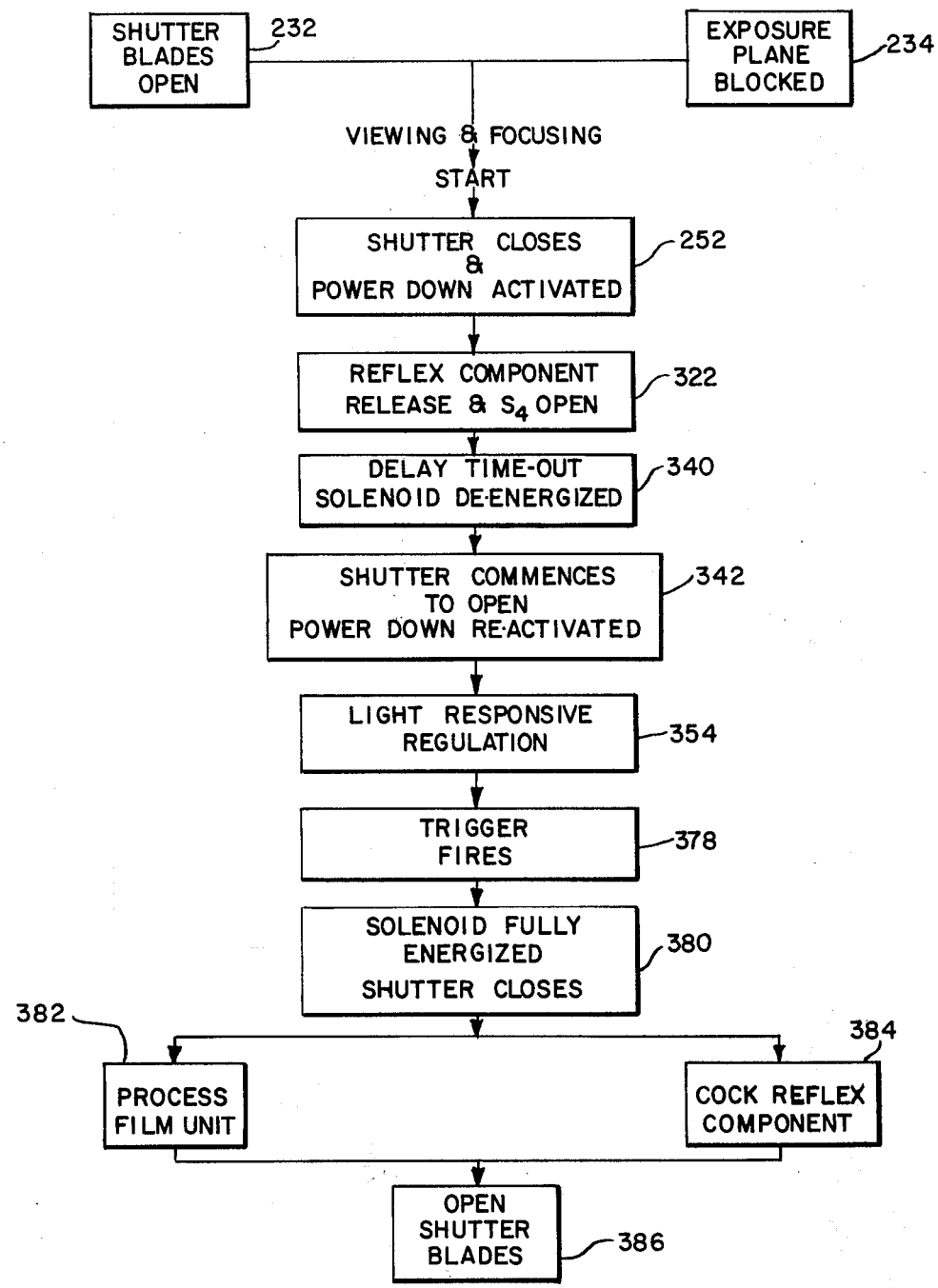
FIG. 8 is a block logic diagram showing a sequence of events occurring during operational cycles of the camera of FIG. 1.
Figures 9, 10:
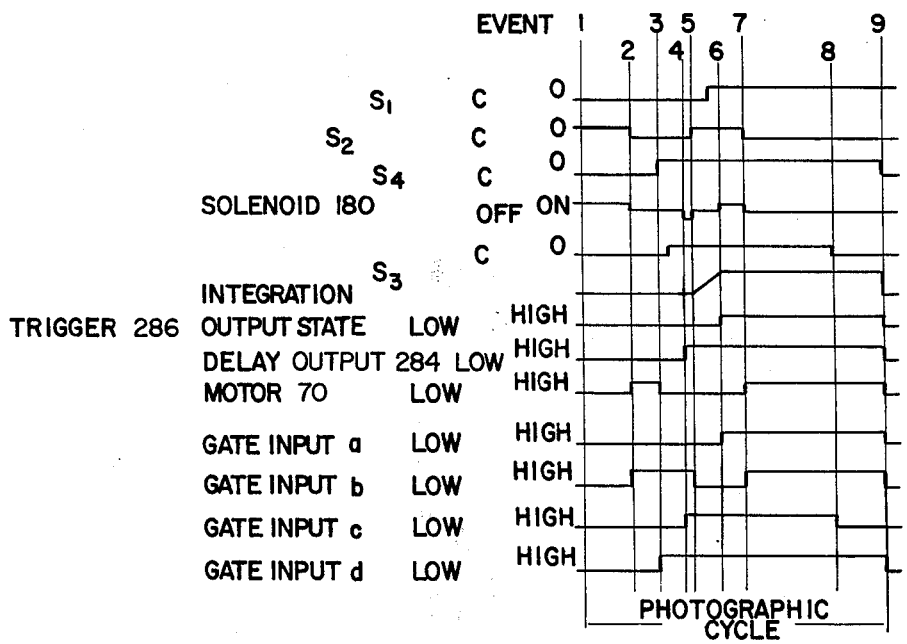
FIG. 9 is a truth table or schedule of operational events performed by the control system of the camera of FIG. 1, showing in logic form, the input and output states of gate functions incorporated within the circuit of FIG. 7 as it operates under ambient lighting conditions.
FIG. 10 is an energization status chart for various components of the circuit of FIG. 7 as they operate throughout a photographic cycle under ambient illumination conditions.

Looking to FIGS. 7, 8 and 9, prior to the commencement of a photographic cycle, the blades of exposure mechanism 66 are fully opened as represented at function block 232 and the exposure plane of the camera is blocked by reflex component 50 as is depicted at function block 234. Following appropriate viewing and focusing, start button 206 is depressed. This depression serves to close the switch designated $S_1$ in FIG. 7. Switch $S_1$ is connected with a primary power line 236 which will be seen to activate a latch driver. Line 236 also is connected with the positive terminal of a battery 238. The opposite terminal of battery 238 is connected by line 240 to ground. Thus connected, primary power line 236 serves to energize or drive a latching network depicted functionally at block 242. Described in detail and claimed in a copending application for U.S. patent by J. P. Burgarella, P. P. Carcia and R. C. Kee, Ser. No. 213,317, filed Dec. 27, 1971 now U.S. Pat. No. 3,744,385, and assigned in common herewith, network 242 operates under two energization states. The first of these states permits the operator of camera 10 to abort a photographic cycle until such time as switch $S_4$ is open. Following the opening of switch $S_4$, a second energization state at network 242 provides for continuous energization of the entire circuit via line 244 even though the contacts of switch $S_1$ are separated. The output of latching network 242 is present at a power distribution line 246 which, in turn, is connected to a branch power line 248. Branch power line 248 is connected to a second branch power line 250 and these two lines serve to power and assert initial control conditions over the various gates and components within the entire circuit. These conditions, as they exist at the commencement of a photographic cycle, are tabulated at Event No. 1 of FIGS. 9 and 10.

As described in connection with function block 252 of FIG. 8, the initial operational event is that of energizing the excitation winding 182 of solenoid 180. This is carried out by asserting select input conditions to the input terminals of multifunction GATES A and B. Looking to these inputs, input terminals a, commonly connected by line 254, exhibit an initial low status by virtue of their connection through line 254 to the output line 256 of a Schmitt trigger 258. Trigger 258 may be of conventional design, having a normally non-conductive input stage and a normally conductive output stage. Energized from branch power line 248 through line 260 and coupled to ground through line 262, the output at line 256 remains low until a signal is received at its input line 264 which is at least equal to a predetermined triggering reference or threshold level. Upon receipt of such signal, the output at line 256 assumes a high status. Such input at line 264 is derived as a control signal generated from an exposure control network designated generally as 266.

Gate input terminal b of GATE A evidences a low state by virtue of its connection through line 268 and power-down resistor 270 to ground. Additionally, this low status extends through the connection of line 268 through lines 272 and 276 to switch $S_2$. Gate input terminal b of GATE B is connected in common with the corresponding input terminal at GATE A through connection of its input line 274 with line 272. As described earlier, switch $S_2$ remains open until such time as exposure mechanism blades 140 and 142 are closed and plunger 188 reaches its position representing an enhanced flux linkage condition. At such time as switch $S_2$ is closed, line 276 is energized through line 278 from primary power line 236.

Gate input terminal c of GATE A is coupled through lines 280 and 282 to the corresponding common input terminal of GATE B. Initial low status of these inputs is derived as a result of the connection of line 282 through line 284 to the output of a Schmitt trigger 286. Similar to trigger 258, Schmitt trigger 286 may be of conventional design, having a normally non-conductive input stage and a normally conductive output stage. Energized from branch power line 250 through line 288 and coupled to ground through lines 290 and 292, the output of trigger 286 remains low until a signal is received at its input at line 294 which is at least equal to a predetermined reference level. Upon receipt of such signal, the output at line 284 assumes a high status. Accordingly, common gate input c remains low pending the triggering of Schmitt trigger 286.

With the assertion of the above-described input logic, the resultant initial output $t_1$ of GATE A present at line 296 is high and is imposed upon the base of an NPN transistor $Q_1$. The emitter of transistor $Q_1$ is coupled along line 298 to ground, while its collector is connected to line 300. Line 300, in turn, connects to the excitation winding 182 of solenoid 180 which, in turn, is connected to primary power line 236 through line 302. Solenoid 180 is designated functionally in FIG. 7 by a dashed boundry. The "high" status at line 296 serves to forward bias the base-emitter junction of transistor $Q_1$, thereby energizing winding 182 to cause exposure mechanism 66 to block the optical path of camera 10. The output $t_2$ of GATE B is low at the commencement of a photographic cycle and is coupled through a current limiting resistor 304 in the line 306 to line 300. GATE B serves the noted powering-down function wherein solenoid 180 is energized at a lower current level when plunger 188 thereof gains a position at least representing a high flux linkage condition. To carry this out, GATE B diverts solenoid energizing current through limiting resistor 304. When transistor $Q_1$ is forward biased, however, this diversion through resistor 304 is insignificant. The powering-down feature of the control system is described and claimed in a copending application for U.S. patent by C. H. Biber and E. K. Shenk entitled "Photographic Apparatus With Solenoid Powered Instrumentalities" Ser. No. 163,948 filed July 19, 1971 and assigned in common herewith.

Solenoid 180 being energized, blades 140 and 142 of exposure mechanism 66 are driven toward their fully closed position in consequence of the electromagnetic retraction of plunger 188. As discussed in connection with FIG. 5, at this point in the photographic cycle, actuating extension 228 of striker cap 198 urges contact rod 222 into circuit completing engagement with conducting surface 224 of switch $S_2$. As noted at Event No. 2 of FIGS. 9 and 10, the closure of switch $S_2$ alters the b input terminal state at lines 272 and 274 from a low to a high. As a consequence, output $t_1$ of GATE A converts to a low state to remove the forward bias at transistor $Q_1$. Energization of winding 182 continues under the noted powering-down operation of GATE B. This input terminal b alteration also changes the output $t_3$ of GATE C. While Event No. 1 is being carried out, the output $t_3$ at line 308 is high. This high output is established as a result of a low state present at line 310 interconnecting common input terminals a. Note, for instance, that line 310 is connected with line 254, the latter line providing the common coupling of the corresponding inputs a of GATES A and B. Gate input terminal d of GATE C remains low in consequence of its connection through lines 312, 314 and closed switch $S_4$ to ground. Input terminal b, being coupled to line 276, alters from a low to a high state upon the closure of switch $S_2$. The resultant high output $t_3$ of GATE C, when introduced at line 308, signals a motor control function depicted generally by block 316 to energize motor 70 (FIG. 1). Motor control function 316 is energized from primary power line 236 through line 318 and is connected to ground through line 320.

Described in detail in a copending application for U.S. patent, Ser. No. 299,667 entitled "Photograhic Apparatus With Precision Motor Control" by J. J. Abbadessa, filed Oct. 24, 1972 (now abandoned) and assigned in common herewith, control function 316 responds to the output $t_3$ to selectively energize motor 70 and impose a dynamic braking thereto to provide for precision switching operations. As was described in connection with FIGS. 1 and 2 and is illustrated at function block 322 of FIG. 8, energization of motor 70 serves to rotate cycle phase control cam 76 such that follower 78, fixed to ram 80, is released from cam engaging contact. With such release, reflex component 50 is driven upwardly towards rear wall 12 while ram 80 moves forwardly in simultaneous correspondence. At the commencement of such movement, tab 90 releases from engagement with the insulative cap 92 of leaf 94 of switch $S_4$ to develop a signal condition providing for the de-energization of motor 70.

Returning to FIGS. 7, 9 and 10, as shown at Event No. 3 the opening of switch $S_4$ alters the status of input terminal d of GATE C to a high condition and the resultant output $t_3$ of the gate becomes high. The presence of this signal at line 308 causes motor control function 316 to de-energize and brake motor 70.

The opening of switch $S_4$ and resultant alteration of the status of input terminal $d$ serves to signal latching network 242 to assume its second energization state which commits the control system to the completion of a photographic cycle. Note in this regard that network 242 is connected with input terminal $d$ through lines 324, 326 and resistor 328.

When released for movement by energization of motor 70, reflex component 50 moves toward an abutting contact with an inwardly disposed portion of rear wall 12. As component 50 closely approaches its exposure mode position, ram 80, acting through tab 90, opens the contacts of switch $S_3$. Represented as Event No. 4 in FIGS. 9 and 10, the opening of switch $S_3$ serves to activate an R-C timing network identified generally at 330. Formed of a timing resistor 332 and a timing capacitor 334 coupled within line 336 between ground and branch power line 250, network 330 serves to delay the commencement of exposure regulation. This delay function is selected having a time constant sufficient to permit reflex component 50 to fully seat at its exposure position. Network 330 is activated upon removal of a shunt about capacitor 334 which is constituted by a line 338 connected, from a point intermediate capacitor 334 and resistor 332, to ground through switch $S_3$.

As depicted in connection with function block 340 of FIG. 8 and Event No. 4 of FIGS. 9 and 10, following an appropriate time-out of network 330, a threshold signal is developed at input 294 of trigger 286, thereby altering its output at line 284 to a high status. This high status, as introduced from line 284 to lines 282 and 280, simultaneously alters the state of all common gate inputs $c$ to a high status. Such alteration changes the output $t_2$ of GATE B to a high state, thereby abruptly terminating current flow in line 276 with the consequence of de-energizing the excitation winding 182 of solenoid 180. With this de-energization, plunger 188 commences to move from its fully seated position under the bias of opening spring 196. As plunger 188 moves slightly beyond its fully seated position, actuating extension 228 moves to, in turn, permit the resilient contact rod 222 to move off of conducting surface 224 of switch $S_2$. As shown at function block 342 in FIG. 8 and cataloged at Event No. 5 in FIGS. 9 and 10, such activation of switch $S_2$ alters the state of common input terminals $b$ from a high to a low. As a result, output $t_2$ of GATE B alters to a low status to reenergize winding 182 of solenoid 180 at the earlier-noted lower current level. This level may, for instance, amount to about 10% of the initial energization current level imposed at winding 182.

As plunger 188 is driven by spring 196, walking beam 154 is rotated and blades 140 and 142 are driven toward open terminal positions. However, the rate at which the blades are so driven is electromagnetically damped or retarded a predetermined amount. To provide calibration of this rate, resistor 304 may be present as a variable resistor or, alternately, the amount of loading provided at spring 168 may be adjusted.

In addition to effecting the de-energization of excitation winding 182, the signal change in line 282 also is introduced through an inverter 344 to activate an electronic switch shown generally at 346. Described in detail and claimed in a copending application for U.S. patent by E. K. Shenk, Ser. No. 213,289, entitled "Exposure Control System Incorporating Solid State Switching to Enable a Light Sensitive Network" filed Dec. 27, 1971 (now abandoned) and assigned in common herewith, when triggered, swtich 346 removes a shunt established by lines 348 and 350 across a timing capacitor 352. The removal of this shunt activates exposure control network 266, thereby providing the exposure or light integration feature illustrated at block 354 in FIG. 8 and taking place during Event No. 5.

Network 266 includes a photovoltaic cell 356 positioned within the exposure housing 16 of camera 10 behind entrance optics 152 as well as behind secondary or sweep openings 148 and 150 of blades 140 and 142. Cell 356 is connected to the input of an operational differential-type amplifier 358 by lines 360 and 362. Timing capacitor 352 is coupled within a feedback path between the output 364 of amplifier 358 and its input at line 362.

Described in greater detail in U.S. Pat. No. 3,620,143, the output of this light sensing arrangement at line 364 represents an integrated valuation of scene lighting as witnessed at the optical path of camera 10. This output is varied in accordance with the sensitometric properties of a film unit being exposed by a second amplification stage 364. Amplification stage 364 operates in conjunction with a gain adjusting variable resistor 366 and a calibrating resistor 368, the latter being positioned within a feedback path line 370. The noted film speed calibration adjustment of the output at line 364 is described in greater detail in U.S. Pat. No. 3,641,891.

Note that power supplies for both amplifiers 358 and 364 are provided from branch power line 248 and line 372, while ground connections for the amplifiers, respectively, are provided through lines 374 and 376.

The adjusted output from network 266 is presented along line 264 to trigger 258. When the signal value at line 264 reaches the threshold or trigger level of trigger 258, the output thereof at line 256 converts from a low to a high state. This conversion is represented in FIG. 8 at block 378 and in FIGS. 9 and 10 as operational Event. No. 6. As displayed in the latter figures, the resultant high output at line 256 alters the status of common gate input terminals $a$ to a corresponding high status. The resultant outputs of GATES A and B are converted. For instance, output $t_1$ of GATE A is changed to a high state and output $t_2$ of GATE B is changed to a low status. The high output at line 296 serves to forward bias the base-emitter junction of transistor $Q_1$, thereby energizing solenoid winding 182 from line 300, in turn, causing solenoid 180 to retract plunger 188 toward its seated position and, in turn, effect the closing of blades 140 and 142 to terminate an exposure interval as depicted at block 380 in FIG. 8 and at Event No. 7 in FIGS. 9 and 10.

The presence of venting orifice 214 in solenoid 180 enhances the rapidity of retraction of plunger 188. For instance any pneumatic compression within the working gap is released. Greater retraction rates permit lessened anticipation leads as derived at secondary openings 148 and 150. As a consequence, the light sensing network of the camera may be alloted a lengthier "sampling interval" for any given exposure. This lengthening of the sampling interval is highly advantageous where camera 10 is operated under scene conditions evidencing high brightness levels.

As plunger 188 is rapidly retracted into its position representing a high flux linkage condition, actuating extension 228 of striking cap 198 engages contact rod 222 of switch $S_2$ to move the upper portion thereof into contact with conducting surface 224. Switch $S_2$ being thus closed, the status of input terminals b at GATES A and C convert from a low to a high state. As shown in Event No. 7 in FIGS. 9 and 10, the latter input alteration changes the output $t_3$ of GATE C to a low status, thereby again activating control 316 to cause motor 70 to be energized. Thus energized, the motor rotates cycle phase cam 76 (FIG. 1) to drive ram 80 rearwardly. As ram 80 is driven rearwardly, reflex component 50 is returned to the viewing-focusing position. In the course of this movement, pick assembly 44 is actuated to draw a photographic unit 34 from cassette 32 and move its forward edge into the bite of rotating processing rolls 110 and 112 to process the film unit and drive it from receiving chamber 28.

As in the earlier energization of solenoid 180, the alteration of the status of input terminals b at GATES A and C also serves to change the output $t_1$ of GATE A to a low status, thereby removing the forward bias at transistor $Q_1$. The earlier described power-down function performed by GATE B continues the energization of winding 182 at the selectively lowered current level.

As reflex component 50 is driven from its exposure position, switch $S_3$ is closed, thereby reactivating the shunt imposed by line 338 about timing capacitor 334. The output of trigger 286 returns to a low status to, in turn, change the state of common input terminals c to a low status.

Looking additionally to FIGS. 1 and 2, as reflex component 50 reaches its seated viewing-focusing position, tab 90 of ram 80 re-engages the insulative cap 92 of leaf 94 of switch $S_4$. Continued energized rotation of motor 70 causes cam 76 to drive ram 80 further rearwardly while such additional movement at its connection with component 50 is taken up by a lost motion connection within their interconnecting spring drive. Such interconnection is described in detail in U.S. Pat. No. 3,685,416. The processing of film unit 34 and cocking of reflex component 50 into their positions are depicted respectively by function blocks 382 and 384 in FIG. 8.

As displayed as Event No. 9 in FIGS. 9 and 10, the closure of switch $S_4$ changes the condition of gate input terminal d from a low to a high status to, in turn, change output $t_3$ at line 308 to a high status, thereby signalling motor control function 316 to de-energize motor 70. Additionally, the signal change witnessed at line 326 and line 324 serves to signal latching function 242 to shut down the entire circuit in preparation for a next succeeding photographic cycle. With the de-energization of the entire circuit, winding 182 of solenoid 180 is again de-energized to permit plunger 188 to be driven outwardly under the bias of opening spring 196. In consequence, blades 140 and 142 are driven to their fully opened positions for facilitating viewing and focusing for the next photographic cycle. This opening movement is depicted in FIG. 8 at function block 386.

Figure 11:
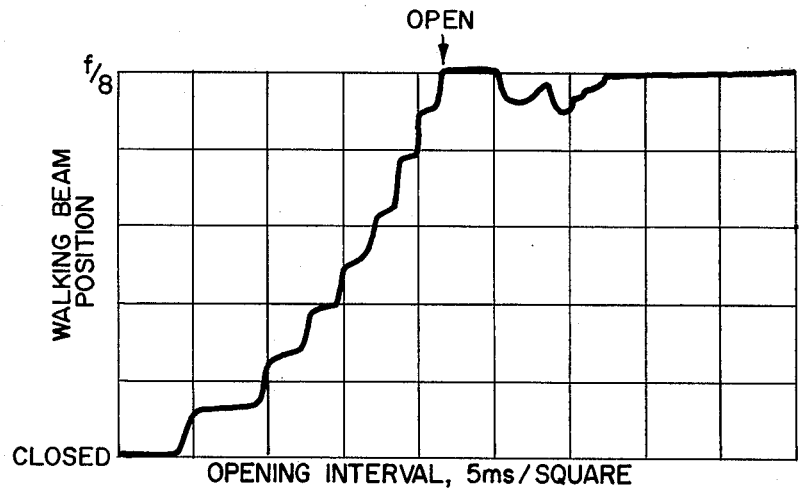
FIG. 11 is a drawing of an oscillotrace graphically describing the operation of an exposure mechanism as described above operating without a solenoid damping feature.
Figure 12:
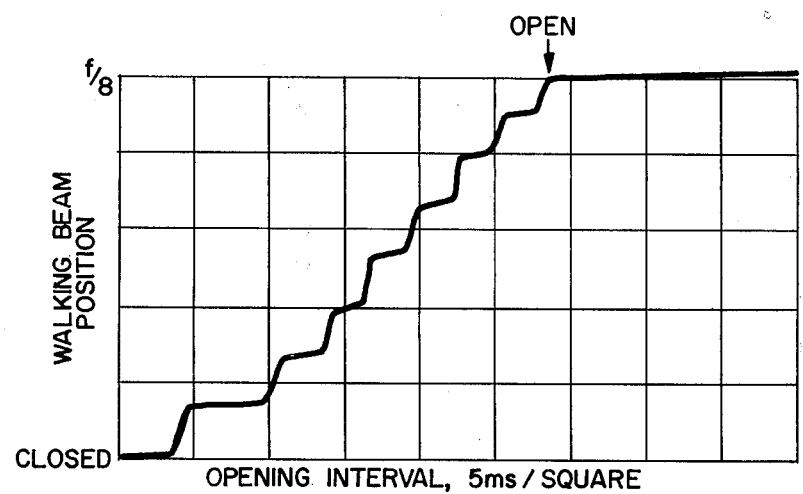
FIG. 12 is a drawing of an oscillotrace showing the arrangement of FIG. 11 operating in conjunction with pneumatic damping.
Figure 13:
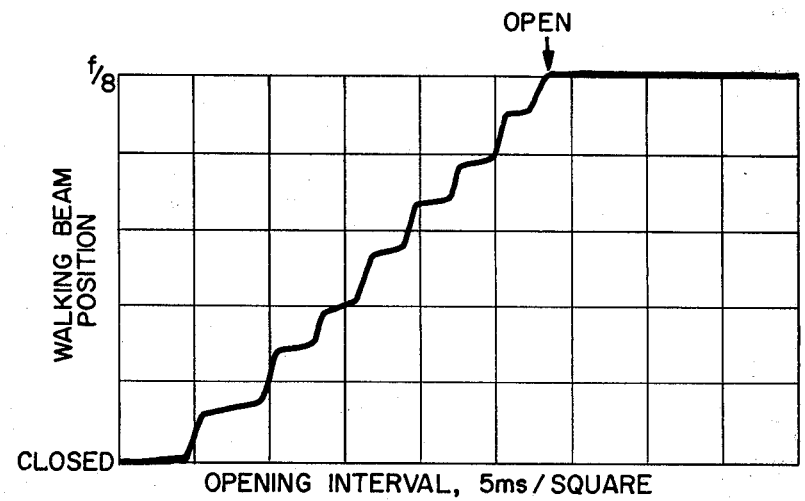
FIG. 13 is a drawing of an oscillotrace showing the operation of an exposure control system which incorporates the magnetic damping feature of the invention.

Referring to FIGS. 11-13, drawings of oscillotraces charting the rate of opening movement of an exposure mechanism such as that shown at 66 are provided. In preparing the oscillotraces, the rate of rotation of a walking beam as at 154 as the beam moved from a fully closed to a fully opened position was measured. Measurement was derived photoelectrically utilizing discrete positional photocell sensing, hence the stepped shape of the resultant curves.

In FIG. 11, a solenoid having its plug portion as at 190 vented, for instance by a hole as at 214, was utilized to drive a walking beam and shutter assembly. The plunger of the solenoid was biased for outward movement by a spring evidencing a 30 gram load when the plunger was seated and a 10 gram load at the termination of its outward stroke. With no damping imposed upon this outward movement, the elapsed period for opening amounted to about 18 milliseconds. In this demonstration, the plug as at 190 within the solenoid was vented with an orifice as described at 214 in the earlier figures. While the presence of such an orifice advantageously enhances the rate of closure of such solenoid driven exposure mechanisms, its effect, without a retardation arrangement on opening is deleterious should a desirably expanded exposure program be desired.

Looking to FIG. 12, the opening characteristics for a test arrangement wherein such an orifice as described at 214 was blocked and pneumatic damping permitted to take place is revealed. Note in this instance that the total opening time interval is desirably increased to about 28 milliseconds, an interval permitting a highly desirable exposure program. Pneumatic damping was achieved by control of the tolerances in the manufacture of the plunger as at 188 and the non-magnetic liner as described earlier at 192. Of course, where a high volume manufacture is contemplated such an arrangement is impractical. Additionally, pneumatic damping arrangements may be subject to dynamic variations occasioned with humidity or temperature changes as well as particulate matter within the operational air environment.

FIG. 13 shows the comparitive results obtained utilizing the magnetic damping feature of the invention. In this arrangement, the power-down current was reapplied as the plunger commenced to move to open the shutter blades. This current represented about 1/10 of the initial energization current levels. The resultant elapsed opening interval lasts about 28 milliseconds, equivalent to that provided by pneumatic damping. Another advantageous feature of this arrangement resides in the presence of an orifice as at 214 venting the air chamber extant between plug 190 and plunger 188. With such venting, desirably higher rate closing intervals are available. Such higher rates serve to improve shutter efficiency as well as facilitate the design of the anticipation function derived with the contour of secondary or sweep openings 148 and 150. As noted earlier, an expanded light sensing network sampling period becomes available.

Since certain changes may be made in the above described apparatus and system without departing from the scope of the invention herein involved, it is intended that all matter contained in the description thereof and as shown in the accompanying drawings shall be interpreted as illustrative and not in a limiting sense.

What is claimed is:

1. An exposure control system for photographic apparatus of a variety including a source of electricity and means defining a scene light entrance opening, comprising:

exposure mechanism means movable about said opening between a closed position blocking the passage of light therethrough and open positions, said movement defining a time dependent variation of aperture values over said opening;

drive means controllable for moving said exposure mechanism toward said open positions and including tractive electromagnetic means;

means for effecting a magnetic retardation of said drive means movement of said exposure mechanism means by energizing said tractive electromagnetic means from said source following commencement of and substantially throughout said movement of said exposure mechanism means toward said open positions, said energization being at a predetermined current level to derive a programmed variation of said aperture values; and means for selectively controlling said drive means so as to define a predetermined value of exposure.

2. A method of operating a photographic exposure control system to define a controlled exposure value, said system including means responsive to a given level of electrical energization for effecting the displacement of said exposure mechanism from one of its said positions into the other of its said positions, said method including the steps of energizing said displacement effecting means at said given level of electrical energization to effect the displacement of said exposure mechanism means from its said one position into its said other position and displacing said exposure mechanism means from its said other position into its said one position by urging said exposure mechanism means towards its said one position while substantially continuously energizing said displacement effecting means at a level of electrical energization less than said given level of electrical energization so as to retard but not preclude the displacement of said exposure mechanism means from its said other position into its said one position.

3. An exposure control system for photographic apparatus of a variety including a source of electricity and means defining a scene light entrance opening, comprising:

exposure mechanism means movable about said opening between a closed position blocking the passage of light therethrough and open positions, said movement defining a time dependent variation of aperture values over said opening;

drive means controllable for moving said exposure mechanism between said positions and including tractive electromagnetic means;

means for effecting a magnetic retardation of said drive means movement of said exposure mechanism means by energizing said electromagnetic means at one current level substantially throughout said aperture value defining movement of said exposure mechanism means to derive a programmed variation of said aperture values; and means for selectively controlling said drive means by energizing said tractive electromagnetic means from said source at another current level to move said exposure mechanism means toward said closed position so as to define a predetermined value of exposure.

4. An exposure control system for photographic apparatus, said apparatus including means for positioning a film unit at a focal plane and means for defining an entrance through which scene light may enter said apparatus to effect an exposure of said film unit, said exposure control system comprising an exposure mechanism mounted for movement between a position wherein it precludes scene light from exposing said film unit and at least one other selected position wherein it does not preclude scene light from exposing said film unit and means for effecting movement of said exposure mechanism between its said positions to define a controlled exposure, said movement effecting means including actuating means responsive to a given level of electrical energization for facilitating the movement of said exposure mechanism from one of its said positions into the other of its said positions and responsive to a level of electrical energization less than said given level substantially throughout the movement of said exposure mechanism from its said other position into its said one position to retard the movement of said exposure mechanism towards its said one position and means for selectively electrically energizing said actuating means at said two mentioned levels from electrical energy source means to alternately facilitate the movement of said exposure mechanism towards its said other position and retard its movement towards its said one position.

5. An exposure control system for photographic apparatus of a variety including a source of electricity and means defining a scene light entrance opening, comprising:

exposure mechanism means movable about said opening between a closed position blocking the passage of light therethrough and open positions, said movement defining a time dependent variation of aperture values over said opening;

drive means including tractive electromagnetic means and loadable spring means, said spring means being configured and arranged for moving said exposure mechanism means toward said open positions;

means for selectively controlling said drive means to define a predetermined value of exposure and operative to energize said tractive electromagnetic means from said source at one current level for loading said spring means and effecting movement of said exposure mechanism means toward said closed position; and means for effecting a magnetic retardation of said movement of said exposure mechanism means toward said open positions by energization of said electromagnetic means at another current level selected lower than said one level substantially throughout said movement of said exposure mechanism means by said spring means.

6. The exposure control system of claim 5 in which said means effecting said magnetic retardation includes electrical calibrating means for selectively adjusting said other current level to regulate the rate of said movement of said exposure mechanism means toward said open positions in accordance with a given standard.

7. The exposure control system of claim 5 in which said spring means includes means for adjusting the extent of said loading thereof to adjust the rate of said movement of said exposure mechanism means toward said open positions in accordance with a given standard.

8. The exposure control system of claim 5 in which: said tractive electromagnetic means is present as a solenoid having an excitation winding and a plunger assembly retractably movable thereinto when said winding is energized at said one current level, said movement being toward a position deriving a high flux linkage condition, said plunger assembly being movable away from said position under the bias of said spring means upon de-energization of said winding; and said means effecting said magnetic retardation is operative to energize said excitation winding at said other level when said plunger assembly is moved under said bias away from said position deriving said high flux linkage condition.

9. The exposure control system of claim 8 in which said solenoid is configured having orifice means for minimizing the pneumatic effects of said movements of said plunger within said excitation winding.

10. The exposure control system of claim 8 in which said means effecting said magnetic retardation includes switch means actuable to effect initiation of said other level energization when said plunger assembly is moved under said bias beyond said position deriving said high flux linkage condition.

11. The exposure control system of claim 10 in which said plunger assembly is configured for selectively actuating said switch means.

12. The exposure control system of claim 10 in which said switch means is operative to effect said other level energization when said plunger assembly has moved during said one level of enegization into said position deriving said high flux linkage condition.

13. In an exposure control system of a variety wherein a tractive electomagnetic device is employed to be energized at one level to drive an exposure mechanism into an orientation blocking the optical path of a photographic apparatus and said mechanism is driven by resilient means to move toward orientations unblocking said optical path, the improvement comprising:

control means for energizing said tractive electromagnetic device at another level of energization selected below said one level substantially throughout said movement when said exposure mechanism is driven toward said unblocking orientations, so as to alter the photographic exposure characteristics of said path in accordance with a predetermined program.

14. In an exposure control system of a variety wherein a solenoid including an excitation winding and a plunger is employed to be energized at one current level to cause said plunger to be retracted toward a position providing a high flux linkage condition within the magnetic circuit of said solenoid, said plunger being driveably associated with an exposure mechanism and spring means such that said mechanism is moved to block a scene light entrance opening when said plunger is retracted and is moved with said plunger by a bias of said spring means to define a variation of aperture values over said opening upon de-energization of said winding, the improvement comprising:

control means for energizing said winding at another current level selected below said one current level substantially throughout said movement under said bias for selectively regulating the rate of said plunger movement under said spring means bias.

15. The invention defined by claim 14 in which said control means is operative to energize said winding at said other current level when said plunger is moved from said high flux linkage position.

16. The invention defined by claim 14 further including means for pneumatically venting said plunger within said solenoid so as to facilitate the said retraction thereof.

17. The invention defined by claim 14 in which said control means includes a switch actuable to effect initiation of said other current level energization when said plunger is moved from said high flux linkage position.

18. The invention defined by claim 17 in which said plunger is configured for selectively actuating said switch.

19. The invention defined by claim 14 in which said control means is operative, when activated, to initially energize said winding at said one current level to effect the said retraction of said plunger and movement of said exposure mechanism to block said opening, thence to energize said windng at said other current level when said high flux linkage position is attained, thence de-energize said winding to effect the commencement of an interval of exposure, thence to energize said winding at said other current level to effect said rate of movement regulation, and thence to energize said winding at said one current level to effect the termination of said interval of exposure.

20. The invention defined by claim 19 in which said control means is operative to provide said other current level energization to regulate the rate of said plunger movement under said spring bias when said plunger is moved from said high flux linkage position.

21. The invention defined by claim 20 further including means for pneumatically venting said plunger within said solenoid so as to facilitate the said retraction thereof.

22. The invention defined by claim 20 in which said control means includes a switch actuable to effect initiation of each said energization at said other current level.

23. The invention defined by claim 22 in which said plunger is configured for selectively actuating said switch.

24. An exposure control system for photographic apparatus of a variety including a source of electricity and means defining an entrance opening for scene light, comprising:

exposure mechanism means movable about said opening between a closed position blocking the passage of light therethrough and open positions, said movement toward said open positions defining a time dependent variation of aperture values over said opening;

solenoid means including an excitation winding and plunger means driveably associated with said exposure mechanism means, said plunger means being movable toward a retracted position deriving a high flux linkage condition upon energization of said winding at one current level for moving said exposure mechanism means toward said closed position;

spring means for biasing said plunger means to move from said retracted position thereby biasing said exposure mechanism means to move toward said open positions; and control circuit means for selectively energizing and de-energizing said solenoid means to define an exposure interval, said control circuit means including means for energizing said excitation winding from said source at another current level when said plunger means attains said retracted position and being operative to effect said de-energization, thence to re-assert said energization at said other current level when said plunger means have moved a predetermined amount under said spring bias way from said retracted position and to maintain said re-asserted energization throughout said movement under said spring bias.

25. The exposure control system of claim 24 in which said control circuit means includes electrical calibrating means for selectively adjusting said other current level to regulate the rate of said movement of said exposure mechanism means towards said open positions in accordance with a given standard.

26. The exposure control system of claim 24 in which said spring means includes means for adjusting the amount of said bias to control the rate of said movement of said exposure mechanism means toward said open positions in accordance with a given standard.

27. The exposure control system of claim 24 in which said control circuit means includes switch means actuable to effect initiation of said other current level when said plunger means is moved under said bias beyond said retracted position.

28. The exposure control system of claim 27 in which said plunger means is configured for selectively actuating said switch means.

29. The exposure control system of claim 27 in which said switch means is operative to effect said other current level energization when said plunger means has moved during said one current level of energization into said retracted position.

30. The exposure control system of claim 24 in which said solenoid means is configured having orifice means for minimizing pneumatic effects emanatiing from said movements of said plunger means within said excitation winding.

31. An exposure control system for photographic apparatus, said apparatus including means for positioning a film unit at a focal plane and means for defining an entrance through which scene light may enter said apparatus to effect an exposure of said film unit, said exposure control system comprising an exposure mechanism mounted for movement between a position wherein it precludes scene light from exposing said film unit and at least one other selected position wherein it does not preclude scene light from exposing said film unit and means for effecting movement of said exposure mechanism between its said positions to define a controlled exposure value, said movement effecting means including a first spring urging said exposure mechanism from one of its said positions towards the other of its said positions, a second spring urging said exposure mechanism from its said other position towards its said one position, said second spring exerting a greater force on said movement effecting means than said first spring thereby causing said exposure mechanism to move into its said one position against the force exerted thereon by said first spring, tractive electromagnetic means responsive to a given level of electrical energization to overcome the influence of said second spring on said exposure mechanism to permit said first spring to move said exposure mechanism from its said one position into its said other position and responsive to a level of electrical energization less than said given level to retard but not preclude said second spring from effecting a movement of said exposure mechanism from its said other position into its said one position and means for selectively electrically energizing said actuating means at said two mentioned levels from electrical energy source means to alternately facilitate the movement of said exposure mechanism towards its said other position and retard its movement towards its said one position.

* * * * *